(12) United States Patent
Dixon

(10) Patent No.: US 7,302,310 B2
(45) Date of Patent: Nov. 27, 2007

(54) MACHINING STOCK AND PART OFFSET CONTROL

(75) Inventor: Scott Dixon, Rexburg, ID (US)

(73) Assignee: Siemens Product Lifecycle Management Software Inc., Plano, TX (US)

(*) Notice: Subject to any disclaimer, the term of this patent is extended or adjusted under 35 U.S.C. 154(b) by 0 days.

(21) Appl. No.: 11/226,900

(22) Filed: Sep. 14, 2005

(65) Prior Publication Data

US 2006/0074515 A1 Apr. 6, 2006

Related U.S. Application Data

(60) Provisional application No. 60/609,777, filed on Sep. 14, 2004.

(51) Int. Cl.
*G06F 19/00* (2006.01)

(52) U.S. Cl. .................................................. 700/187
(58) Field of Classification Search ................ 700/159, 700/172, 176, 182, 187, 193, 59
See application file for complete search history.

(56) References Cited

U.S. PATENT DOCUMENTS

| | | | | |
|---|---|---|---|---|
| 4,186,529 A | * | 2/1980 | Huffman .................. 451/4 |
| 4,618,924 A | * | 10/1986 | Hinds ......................... 700/86 |
| 4,697,240 A | | 9/1987 | Cedar et al. |
| 4,993,896 A | * | 2/1991 | Dombrowski et al. ...... 409/138 |
| 5,288,209 A | * | 2/1994 | Therrien et al. ......... 416/193 R |
| 5,363,308 A | * | 11/1994 | Guyder ........................ 700/187 |
| 5,677,855 A | * | 10/1997 | Skeeters et al. .............. 703/6 |
| 6,019,554 A | * | 2/2000 | Hong .......................... 409/132 |
| 6,415,191 B1 | * | 7/2002 | Pryor .......................... 700/95 |
| 6,760,038 B2 | | 7/2004 | Venkataraman |
| 6,865,442 B1 | * | 3/2005 | Jared .......................... 700/191 |
| 2005/0120010 A1 | * | 6/2005 | Philpott et al. ................. 707/3 |

OTHER PUBLICATIONS

Toh C K: "Design, evaluation and optimisation of cutter path strategies when high speed matching . . . ", Materials and Design, London, GB, vol. 26, No. 6, Sep. 8, 2004.

* cited by examiner

*Primary Examiner*—Leo Picard
*Assistant Examiner*—Chad Rapp
(74) *Attorney, Agent, or Firm*—James Harlan

(57) ABSTRACT

One or more embodiments of the presently preferred invention provides a method and a computer-program product for generating a boundary path from a part geometry and a part boundary, where the part boundary is parametrically associated with the part geometry such that as the part geometry changes so does associated custom boundary member data.

22 Claims, 15 Drawing Sheets

MACHINING STOCK AND PART OFFSET CONTROL

PRIORITY OF APPLICATION

The present application claims priority of U.S. provisional application Ser. No. 60/609,777 filed Sep. 14, 2004, which is incorporated herein by reference.

TECHNICAL FIELD

This invention relates generally to computer aided machining. More specifically, the invention relates to machining stock and part offset control

BACKGROUND

The computer has greatly affected essentially all forms of information management, including the graphical editing and computer aided design and drafting (CAD) tools. Some simpler geometric modeling computer program products are two dimensional, providing only length and width dimensions of objects, while more complex and powerful computer program products provide three dimensional editing and visualization.

Today, computer aided manufacturing (CAM) applications work integral with CAD applications to ease the design and production of machined parts. To mill these machined parts, numerically controlled (NC), or computer numerically controlled (CNC) machines cut away material from a block of matter in various stages, commonly referred to as rough finishing and fine finishing where extra stock can also be added or removed.

The concept of extra stock is known in the industry and refers to adding more or removing more material than the design part to account for other variables. For example, after a part is designed on a CAD/CAM system, it is milled with an extra one millimeter of custom stock surrounding the part so that the part can be heat treated to increase a hardening property of the part. Then the final one millimeter is milled in a fine finish operation on the heat treated part. The fine finish operation occurs because it is easier to rough the part from a non-heat treated "softer" blank and leave one millimeter for fine finish milling, treat the part with extra stock, and remove the remaining one millimeter, than it is to heat-treat the blank, and mill the entire designed part from a hardened blank.

Manufacturing engineers commonly apply stock for reasons mentioned above, and they often have to account for tolerance information not included in the part geometry; as a result it is common to partially offset a part boundary surface at the stage of tool path generation. Without proper functionality, NC-programmers have to resort to workarounds lacking part associativity and requiring a lot of extra effort.

There is a need for a solution that can provide a boundary member solution that can intelligently apply tolerance offsets, and fine finish stocking, while associating the boundary solution to the parametrics of the CAD/CAM design.

Except as may be explicitly indicated otherwise, the following definition(s) apply:

blend, n., generic term for both rounds and fillets.

boundary n., a parameterized curve consisting of an ordered set of contiguous linear or arc segments, where segment is also called member.

SUMMARY

To achieve the foregoing, and in accordance with the purpose of the invention as broadly described herein, the present invention provides a method for generating a boundary path, comprising the steps of: designing a part geometry, defining a part boundary parametrically associated to said part geometry, wherein said part boundary has at least one custom boundary member contiguous to at least one transition boundary member, and customizing said at least one transition boundary member with said at least one custom boundary member, wherein said customizing is at least one of an ignore member function, a tolerance offset function, a member offset function, a supplemental corner option function, and a fine finish stock function. The boundary path represents a milling machine route to create a machined part in at least two finishes. The boundary path represents a milling machine route to create a machined part in at least two finishes, wherein said at least two finishes are one of a rough finish and a fine finish. The transition boundary member is one of a collinear member, a blend member, and a chamfer member. The method further comprising the step of defining a clean-up distance between two custom boundary members having different stock values. The step of customizing said at least one transition boundary member with said at least one custom boundary member is governed at least in part by a rule set that includes: a general stock operation value on said part boundary is added to a general offset global value on said part boundary, a fine finish stock operation value on said part boundary added to a fine finish offset global value on said part boundary, a general stock applied to a respective stock value and tolerance offset while acknowledge a corresponding individual corner option on said part boundary at one of global and operation, and a fine finish offset and a fine finish stock is additive to a plurality of complementary offset values on said part boundary. The step of customizing said at least one transition boundary member with said at least one custom boundary member further comprises at least one of the following steps: applying said ignore member function to disregard at least one custom boundary member, whereby resulting said part boundary remains consistent, applying said tolerance offset function to said at least one custom boundary member, applying said member offset function to said at least one custom boundary member, applying said supplemental corner option function on said at least one transition boundary member, applying said fine finish stock function if determined whether a fine finish stock is applied to said part boundary, and providing a resulting part boundary includes a plurality of custom boundary member and a plurality of transition boundary member.

Another advantage of the present invention is a computer-program product tangibly embodied in a machine readable medium to perform a method for generating a part boundary, comprising: instructions for designing a part geometry, instructions for defining a part boundary parametrically associated to said part geometry, wherein said part boundary has at least one custom boundary member contiguous to at least one transition boundary member, and instructions for customizing said at least one transition boundary member with said at least one custom boundary member, wherein said customizing is at least one of an ignore member function, a tolerance offset function, a member offset function, a supplemental corner option function, and a fine finish stock function. The boundary path represents a milling machine route to create a machined part in at least two finishes. The boundary path represents a milling machine route to create a machined part in at least two finishes, wherein said at least two finishes are one of a rough finish and a fine finish. The transition boundary member is one of a collinear member, a blend member, and a chamfer member. The computer-program product further comprising said instruction for defining a clean-up distance between two custom boundary members having different stock values. The instruction for customizing said at least one transition boundary member with said at least one custom boundary member is governed at least in part by a rule set which include: a general stock operation value on said part boundary is added to a general offset global value on said part boundary, a fine finish stock operation value on said part boundary added to a fine finish offset global value on said part boundary, a general stock applied to a respective stock value and tolerance offset while acknowledge a corresponding individual corner option on said part boundary at one of global and operation, and a fine finish offset and a fine finish stock is additive to a plurality of complementary offset values on said part boundary. The instruction for customizing said at least one transition boundary member with said at least one custom boundary member further comprises at least one of the following: instructions for applying said ignore member function to disregard at least one custom boundary member, whereby resulting said part boundary remains consistent, instructions for applying said tolerance offset function to said at least one custom boundary member, instructions for applying said member offset function to said at least one custom boundary member, instructions for applying said supplemental corner option function on said at least one transition boundary member, instructions for applying said fine finish stock function if determined whether a fine finish stock is applied to said part boundary, and whereby said part boundary includes a plurality of custom boundary member and a plurality of transition boundary member.

Another advantage of the present invention is a general purpose computing machine, comprising: an electronic path for transmitting a part boundary signal wherein said part boundary signal comprises: instructions for milling a part boundary associated to a part geometry, wherein said part boundary has at least one custom boundary member contiguous to at least one transition boundary member, and instructions for milling a customized feature encompassing said at least one transition boundary member adjacent to said at least one custom boundary member.

Yet another advantage of the present invention is a milling machine, comprising: an input path electrically connected to a controller for interpreting a part boundary signal, wherein said part boundary signal comprises: instructions for milling a part boundary associated to a part geometry, wherein said part boundary has at least one custom boundary member contiguous to at least one transition boundary member, and instructions for milling a custom feature encompassing said at least one transition boundary member adjacent to said at least one custom boundary member.

Other advantages of the present invention will be set forth in part in the description and in the drawings that follow, and, in part will be learned by practice of the invention, one of which is the important purpose to control the amount of stock while cutting a part to customize for grind stock, subsequent finishing, or test cuts, for example.

The present invention will now be described with reference made to the following Figures that form a part hereof, and which is shown, by way of illustration, an embodiment of the present invention. It is understood that other embodiments may be utilized and changes may be made without departing from the scope of the present invention.

BRIEF DESCRIPTION OF THE DRAWINGS

A preferred exemplary embodiment of the present invention will hereinafter be described in conjunction with the appended drawings, wherein like designations denote like elements, and.

DESCRIPTION OF THE PREFERRED EMBODIMENTS

I. Computing Environment

Figure 1:
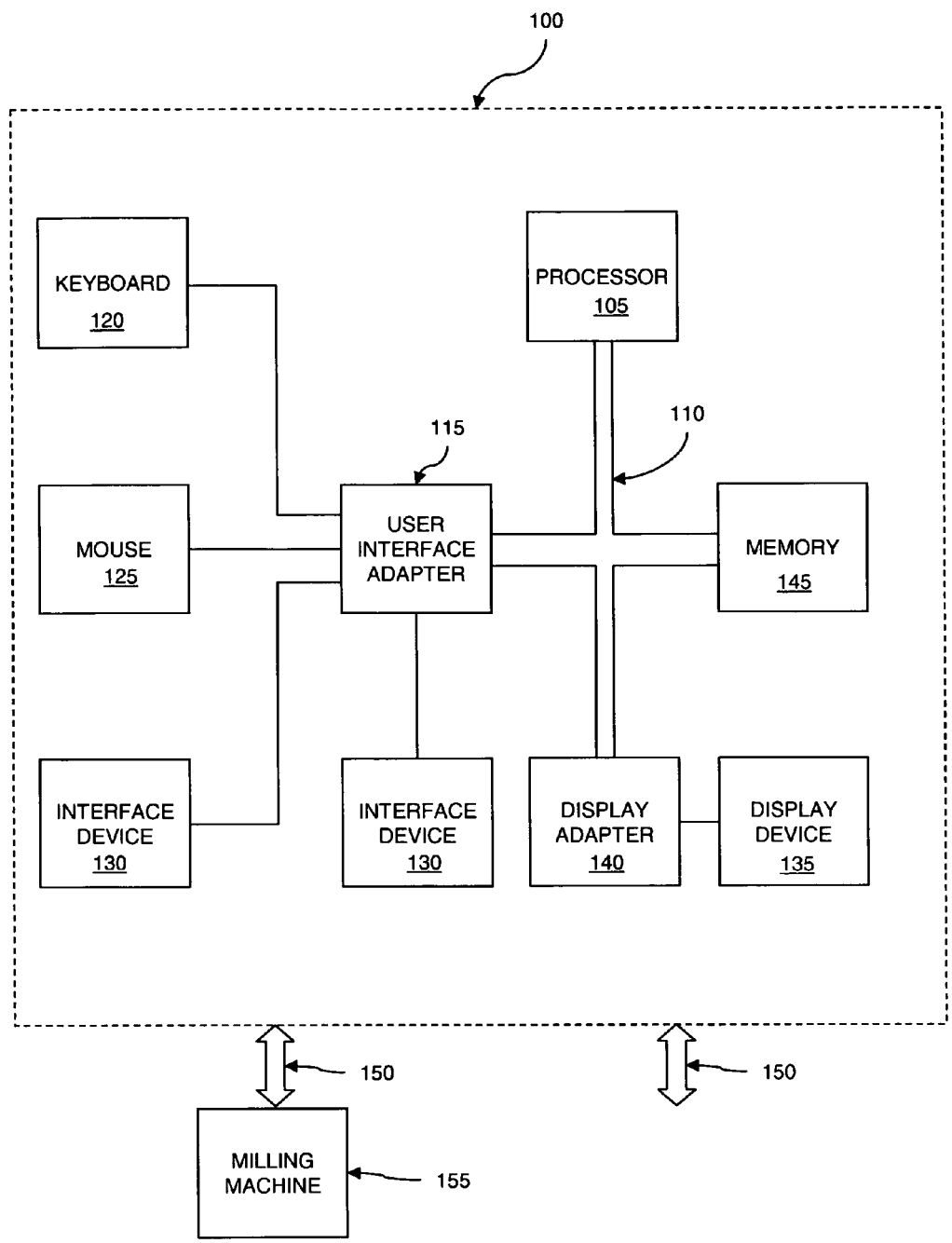
FIG. 1 is a block diagram of a computer environment in which the present invention may be practiced.

The present invention may be performed in any of a variety of known computing environments. The environment of FIG. 1 comprises a representative conventional computer 100, such as a desktop or laptop computer, including a plurality of related peripheral devices (not depicted). The computer 100 includes a microprocessor 105 and a bus 110 employed to connect and enable communication between the microprocessor 105 and a plurality of components of the computer 100 in accordance with known techniques. The computer 100 typically includes a user interface adapter 115, which connects the microprocessor 105 via the bus 110 to one or more interface devices, such as a keyboard 120, mouse 125, and/or other interface devices 130, which can be any user interface device, such as a touch sensitive screen, digitized pen entry pad, etc. The bus 110 also connects a display device 135, such as an LCD screen or monitor, to the microprocessor 105 via a display adapter 140. The bus 110 also connects the microprocessor 105 to memory 145, which can include ROM, RAM, etc.

The computer 100 communicates via a communications channel 150 with other computers or networks of computers, where another computer can be a computer numerically controlled (CNC) milling machine 155 that is adapted to receive electronic signals from the computer 100. The CNC milling machine is electrically connected to a controller (not depicted). The computer 100 may be associated with such other computers in a local area network (LAN) or a wide area network (WAN), or it can be a client in a client/server arrangement with another computer, etc. All of these configurations, as well as the appropriate communications hardware and software, are known in the art.

Software programming code that embodies the present invention is typically stored in a memory 145 of the computer 100. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

The preferred embodiment of the present will now be described with reference to the Figures, wherein like numerals indicate like or corresponding parts throughout the several views. The presently preferred embodiment is practiced using a parametric modeling application embodied in the computer environment to construct a custom member boundary with at least one transition boundary member for generating a tool path boundary according to a custom member boundary algorithm, where the tool path boundary is parametrically associated to a part boundary that a milling tool follows to create an object. A transition boundary member is a fillet, round, chamfer, or other collinear feature. Following the construction of the tool path boundary as disclosed in the presently preferred embodiment, the designer transmits a part boundary signal that consists of data for the custom boundary member to the CNC milling machine to create a machined part. Likewise, the CNC milling machine 155 is adapted to receive the transmitted part boundary signal that consists of data for the tool path boundary as disclosed herein.

II. Custom Member Boundary Algorithm

Figure 2:
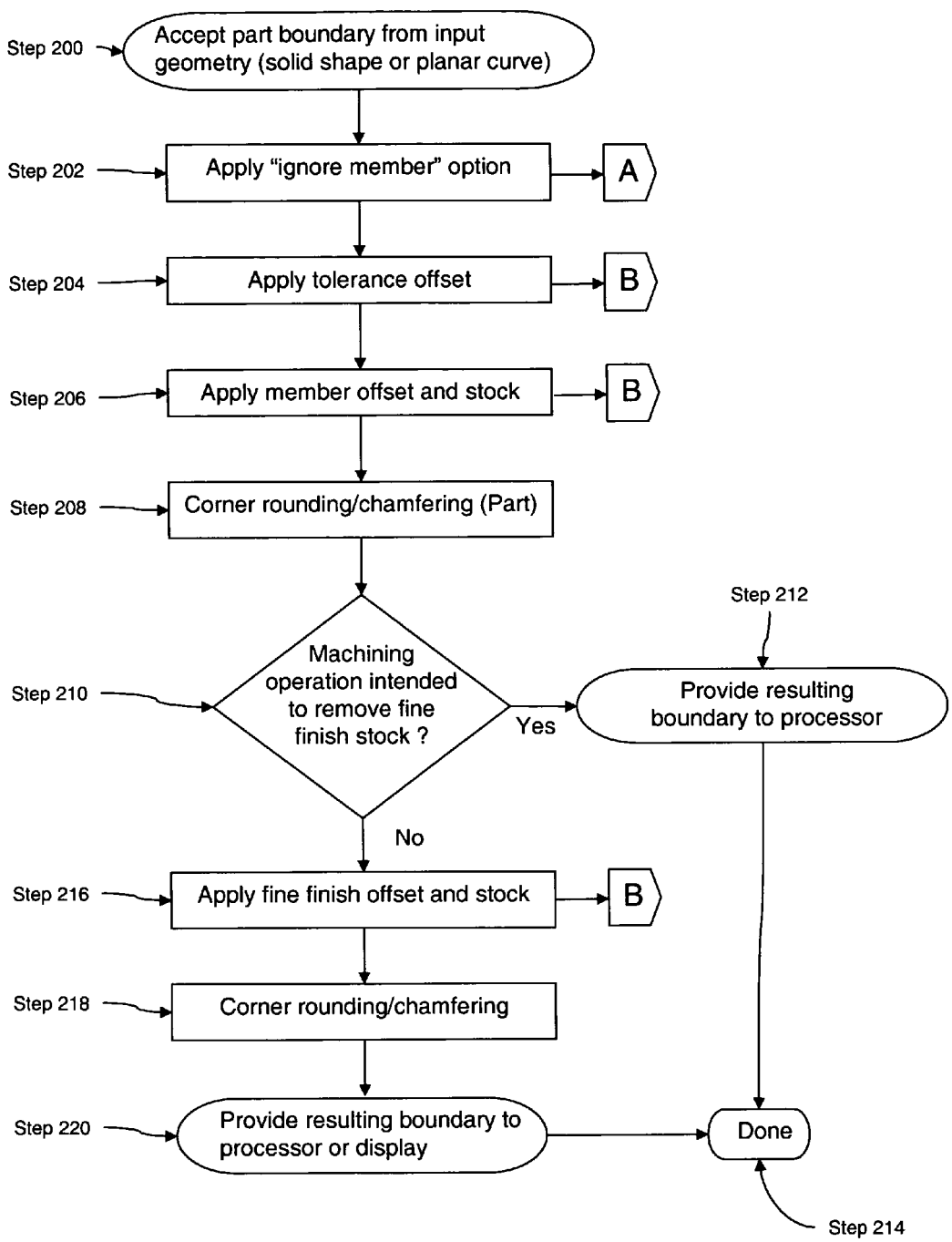
FIG. 2 is a logic flow diagram for the processing logic of a custom boundary member algorithm.
Figure 3:
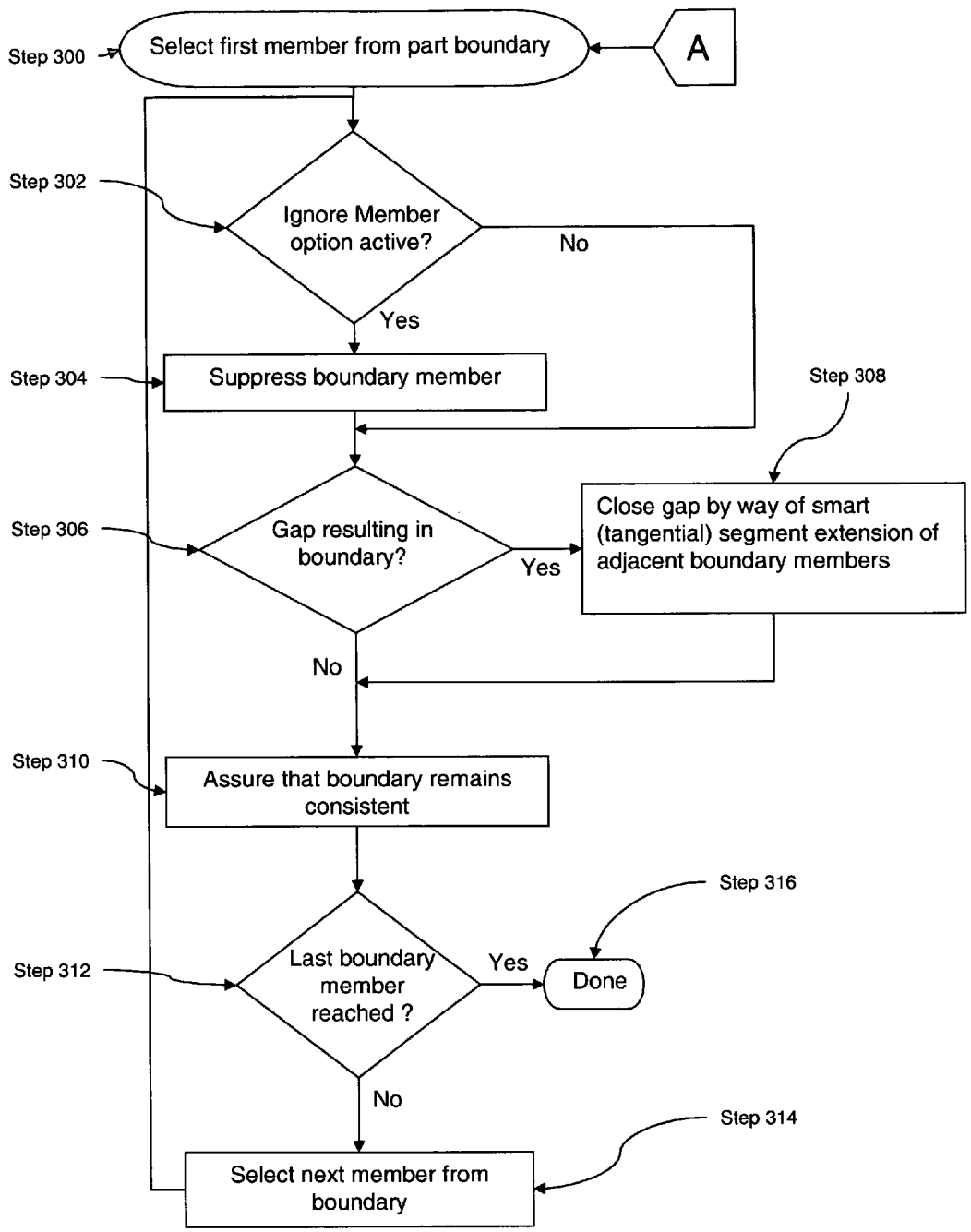
FIG. 3 is a logic flow diagram for the processing logic of an ignore member function for a custom boundary member algorithm.
Figure 4:
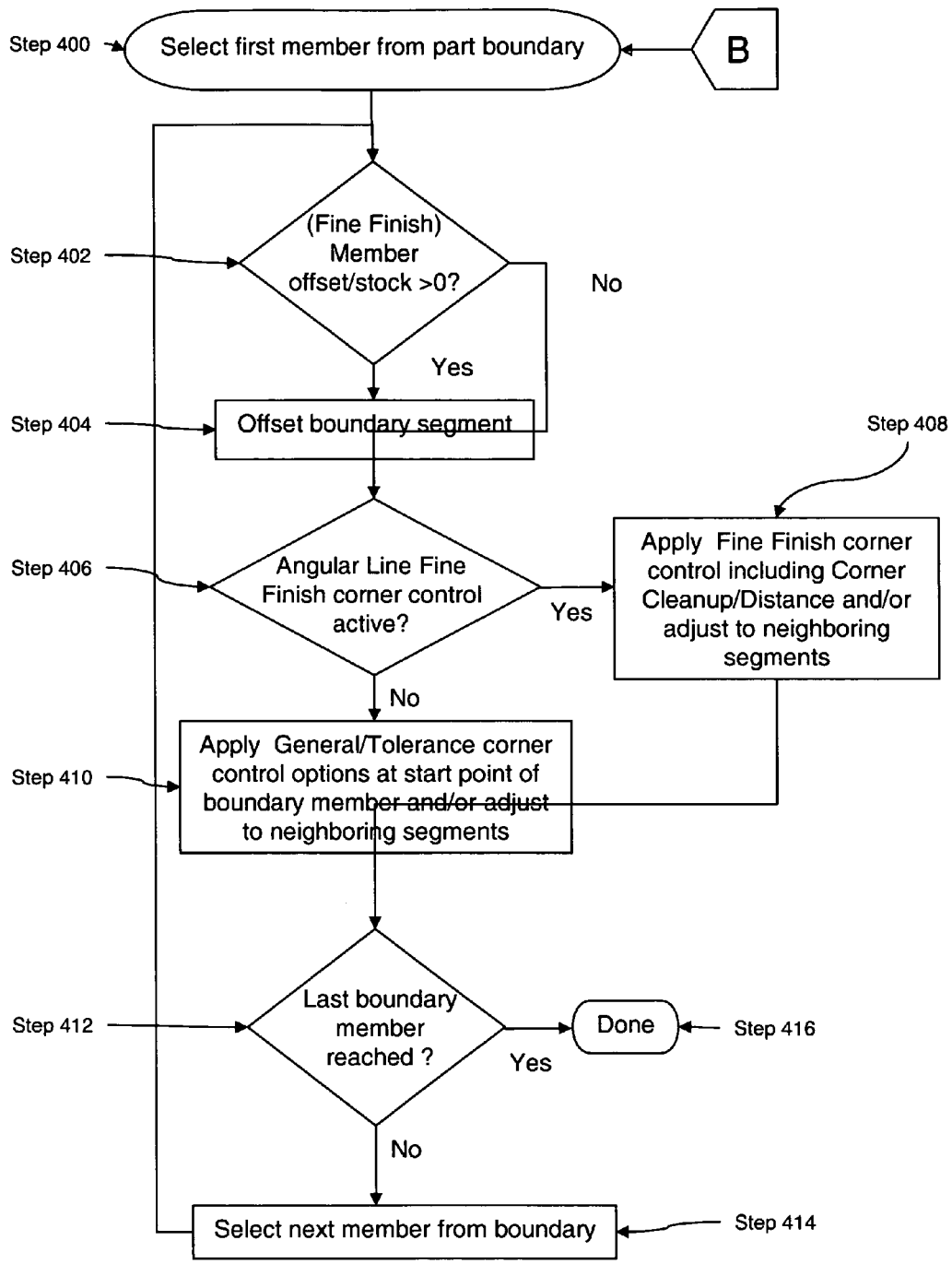
FIG. 4 is a logic flow diagram for the processing logic of a general and fine-finish offset for a custom boundary member algorithm.

Referring now to FIGS. 2 through 4 that depict a series of charts describing the logic flow for the custom member boundary algorithm, the algorithm accepts the part boundary input from the geometry (Step 200), whether that geometry is a solid shape or a planar curve, for example. The designer has the option to select an ignore member function (Step 202), the result of which suppresses single or multiple selected boundary members in specific operations.

Turning to FIG. 3, the designer initially selects a first member from the part boundary (Step 300). If this first member is to be ignored (Step 302), then suppress the boundary member (Step 304) such that the suppressed boundary member is not included in specific milling operations. Continuing, the function checks if there is a gap in the part boundary (Step 306), and closes the gap by way of a smart, or tangential, segment extension of the adjacent boundary members (Step 308). Assuring that the boundary remains consistent to design intent, for example by visually reviewing the part boundary so that it has continuous and simply connected boundary members (Step 310), then continue to the next boundary member (Steps 312 & 314) until reaching the last boundary member when the function returns to the custom boundary algorithm (Steps 312 & 316).

Returning to FIG. 4, the algorithm next provides the designer the choice to apply a tolerance offset (Step 204) by use of a stock/offset algorithm, whose logic flow is illustrated in FIG. 4. Turning to FIG. 4, the function initially selects a first member from the part boundary (Step 400). If this first member is to have a positive stock or offset (Step 402), as seen in a Fine Finish stock operation, then the boundary segment is offset (Step 404) the positive distance. Regardless, the designer next selects whether angular line fine finish corner control is active (Step 406). If so, then the function applies the fine finish corner control including corner clean-up, corner distance, and/or adjusts to adjacent members (Step 408). If however, the angular line fine finish corner control is not active, the function applies general and/or tolerance control corner options at a start point of the boundary member and/or adjusts to adjacent members, accordingly (Step 410). The function then continues to the next boundary member (Steps 412 & 414) until reaching the last boundary member when the function returns to the custom boundary algorithm (Steps 412 & 416).

Returning to FIG. 2, the algorithm next provides the designer the choice to apply a member offset and stock (Step 206) by use of a stock/offset function, whose logic flow is illustrated in FIG. 3. Following modification of the general and tolerance stock/offset, the part boundary corners are supplementary controlled by rounding and/or chamfering (Step 208). If the machining operation is intended to remove the fine finish stock (Step 210), the algorithm returns the resulting custom member boundary for display (Step 212) and exits (Step 214). If however, the designer does add fine finish stock to the part geometry, the algorithm applies the fine finish offset/stock by use of the stock/offset function (Step 216), whose logic flow is illustrated in FIG. 3. Following the fine finish offset/stock modification, the part boundary corners are rounded and/or chamfered (Step 218). And finally, the algorithm returns the resulting custom member boundary for display (Step 220) and exits (Step 214).

III. Corner Control Options

Figure 5A:
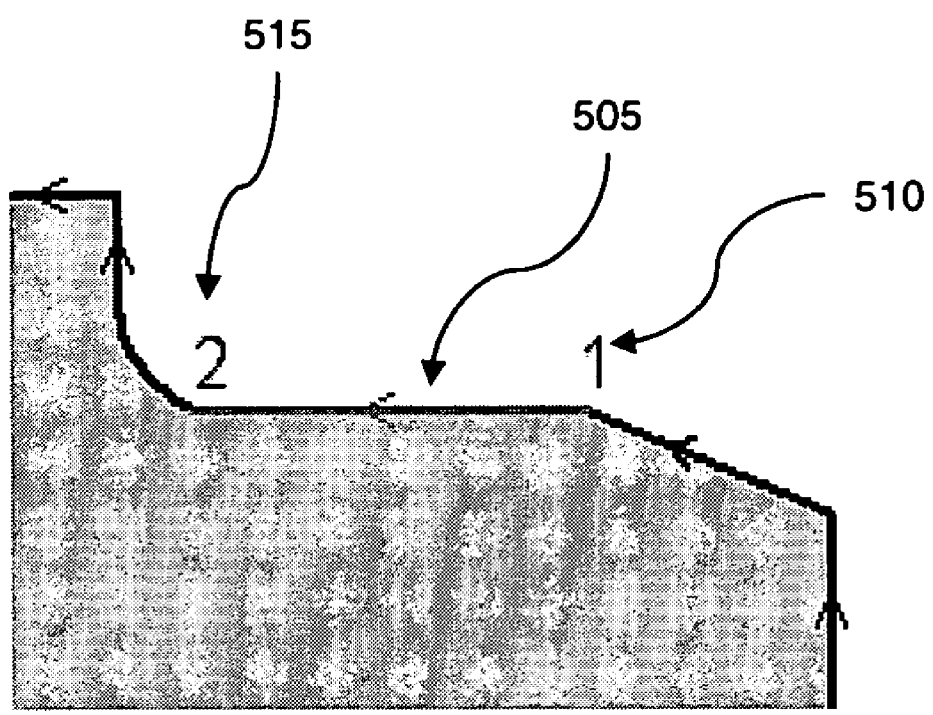
FIG. 5 depicts a custom member edit dialog and associated result of selecting a member.
Figure 5B:
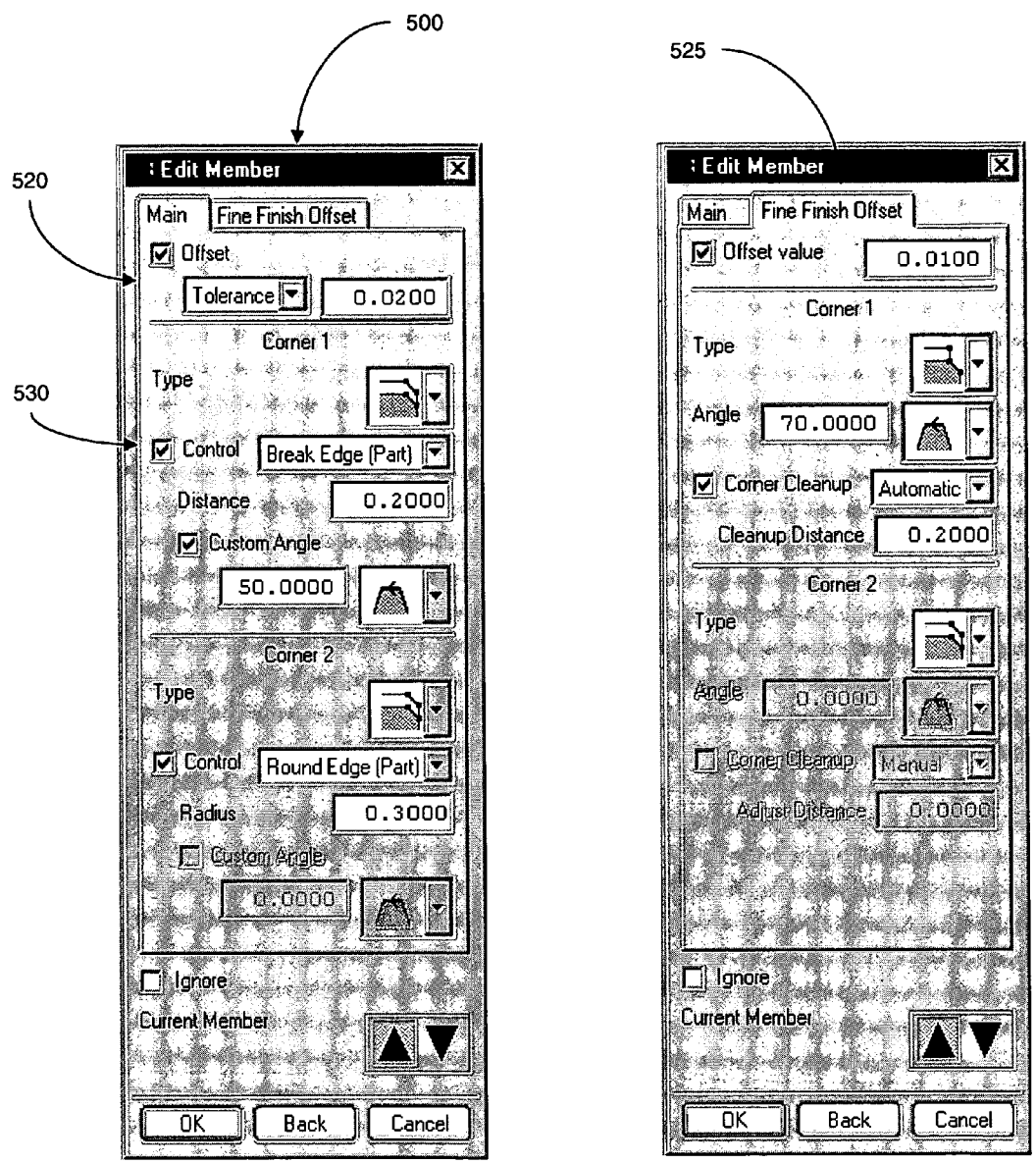

Referring to FIG. 5a and FIG. 5b, the presently preferred embodiment incorporates the custom member boundary algorithm following activation of a custom member edit dialog 500 by the designer to define custom corners on a boundary member 505. Once the boundary member 505 is selected, it is highlighted and two graphical symbols that identify a Corner 1 510 and a Corner 2 515, respectively, are displayed. The Corner 1 510 refers to the corner formed by the vertex that is adjacent to the current and the previous member, while the Corner 2 515 represents the endpoint of the current member.

A. General Corner Options

Using the custom member edit dialog 500, the disclosed embodiment provides the designer the ability to toggle between a main general/tolerance tabbed window 520 and a fine finish offset tabbed window 525 while providing an offset value input field for both. The main general/tolerance tabbed window 520 is further broken down into a General offset selection (Step 206) is a universal method of controlling corner quality in offsetting, and follows Step 204 and Step 206. And the main general/tolerance tabbed window 520 is further broken down into a Tolerance offset selection (Step 204) is designed for offsetting and corner control related to part tolerance.

Figure 6A:
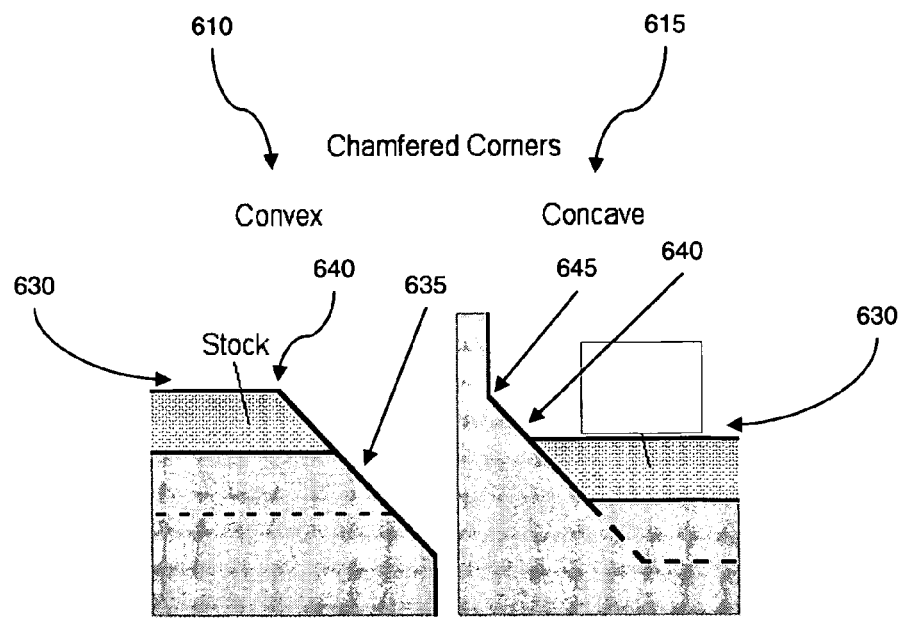
FIG. 6 depicts the result of s designer applying a general corner control option.
Figure 6B:
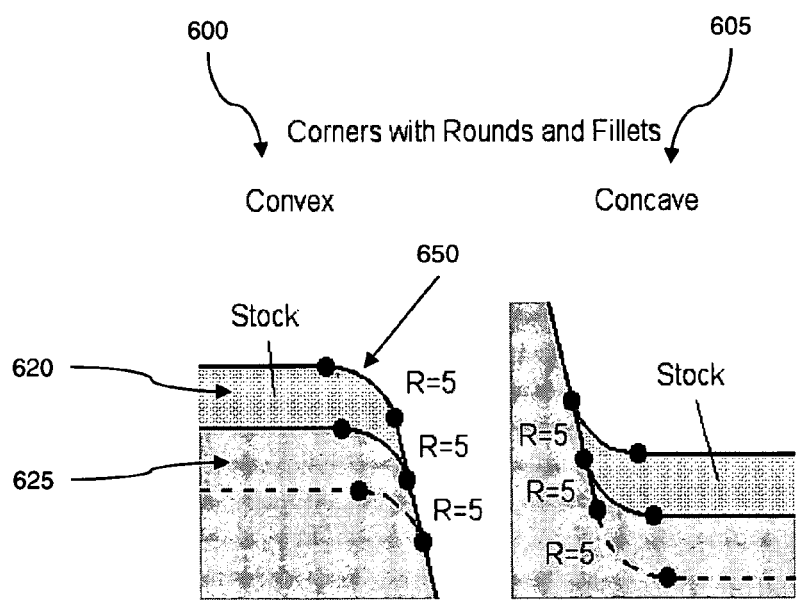

FIGS. 6a and 6b depict a convex round corner 600, a concave fillet corner 605, a convex chamfered corner 610, and a concave chamfered corner 615, that represent the result of the designer applying a general corner control option, displaying a positive stock 620 and a negative stock 625. For the convex chamfered corner 610, the present preferred embodiment extends a stock member 630 tangent and a first adjacent convex chamfer member 635 tangent after stocking to an intersection point 640, which becomes a new shared vertex after offsetting. The extension (tangential line) of the stock member 630 and the first adjacent convex chamfer member 635 ensures a clean corner at the convex chamfered corner 610. For the negative stock 625, the first adjacent convex chamfer member 635 is shortened. Thus, depending on the sign of the stock value, the chamfer gets longer or shorter, but does not change its (polar) angle. This means, the relative orientation of any of the adjacent members remains the same.

In the case of the concave chamfered corner 615, the presently preferred embodiment shortens an adjacent concave fillet member 645 to the stock member 630. Put another way, the stock member 630 is extended to the intersection point 640 with the concave chamfered corner 615. The chamfer keeps its angle but its length gets shorter. Also this option is usually employed to create stock for finishing or grinding. If both of the corner's adjacent edges receive a non-zero stock value, the extension is applied in a straightforward manner maintaining best surface quality.

In the case of the convex round corner 600 and the concave fillet corner 605, an arc 650 moves up or down, depending on whether the applied stock is positive or negative. Put another way, the arc's radius is not changed, and instead, its center point and vertices are translated to make the arc fit smoothly to the adjacent offset members that usually need to be extended tangentially for this purpose. The disclosed invention ensures that the members, the arc and its adjacent linear members, do not change orientations to each other, for example tangentially orientated. Thus the arc 650 remains tangent after the stocking, and its radius does not change.

B. Tolerance Offset

Figure 7:
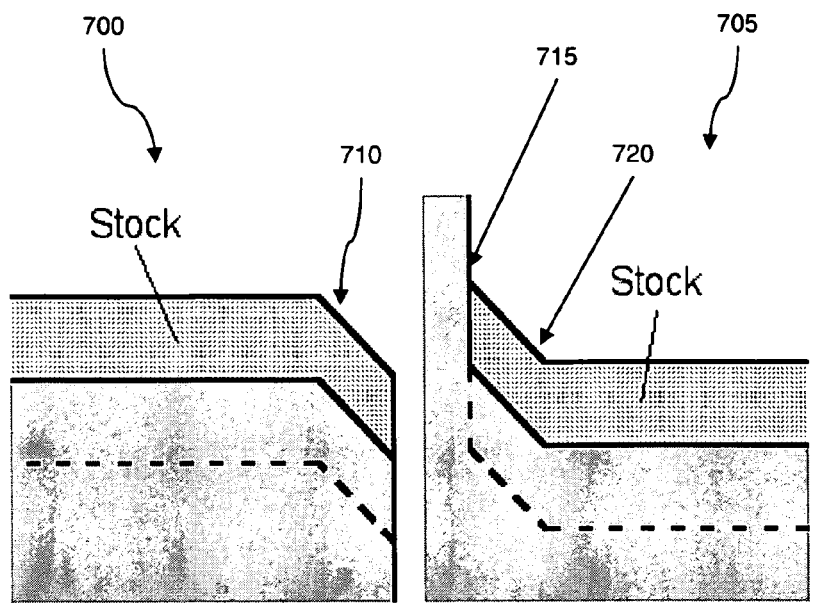
FIG. 7 depicts the result of s designer applying a tolerance offset corner option on chamfered corner.

Referring now to FIG. 7, the presently preferred embodiment allows the designer to customize boundary members beginning with including Tolerance Offset, one of which is a constant convex chamfer corner 700, and a constant concave chamfer corner 705. For both the constant convex chamfer corner 700, and the constant concave chamfer corner 705, a chamfer 710 moves up or down, depending on whether the stock is positive or negative. During this operation, the chamfer's 710 length does not change when a first endpoint 715 and a second endpoint 720 is translated. To maintain design intent, this chamfer option has the same size and angle after stocking, as it did before stocking. For a constant radius fillet round and a constant radius concave fillet, the result of the application of the Tolerance offset is the same as that seen with the general corner options for convex round corner and concave fillet corner, respectively, in III.A.

Figure 8:
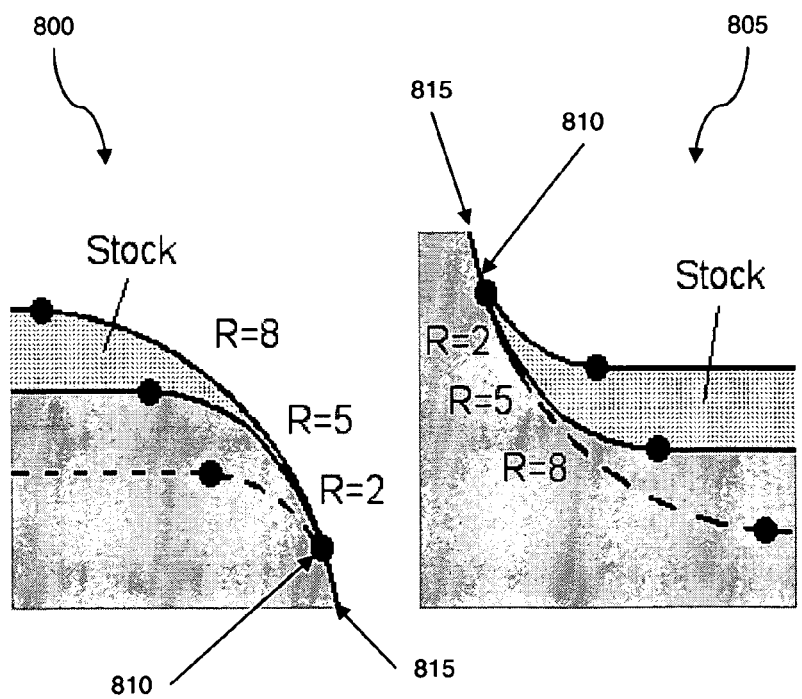
FIG. 8 depicts the result of s designer applying a tolerance offset with a keep tangent point corner option on blended corner.

Referring now to FIG. 8, the presently preferred embodiment provides the designer the ability to modify the tolerance offset with a keep tangent point convex round corner 800 and a keep tangent point concave fillet corner 805. The application maintains tangency for the keep tangent point convex round corner 800 and the keep tangent point concave fillet corner 805 to a shared tangent point 810 that is a shared vertex with a non-offset adjacent member 815. The blend's radius is extended or reduced by the amount of the largest stock at either side of its own stock and adjusted, such that the offset members intersect the extended adjacent members. The keep tangent point option for chamfered corners is identical to that discussed in the general corner option above, III.A.

Figure 9A:
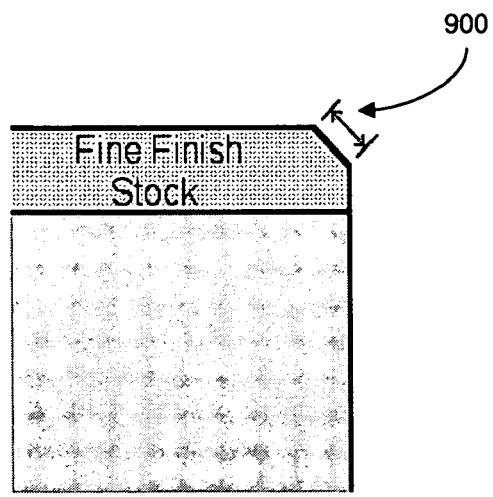
FIG. 9 depicts the result of s designer applying a supplementary corner control that applies after offsetting (a) or before offsetting (b)
Figure 9B:
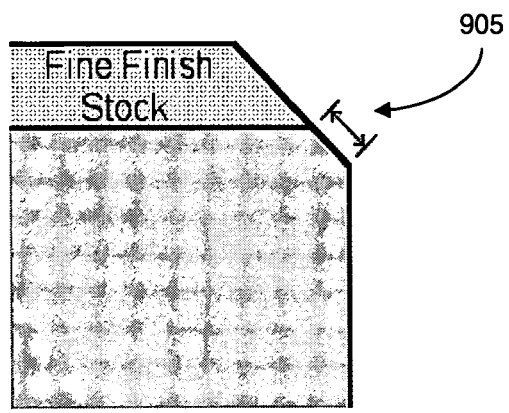

Referring to FIG. 9a and FIG. 9b, each corner option contains a control toggle 530 that allows the designer to specify a plurality of supplementary corner control options like: Roll Around Corner, Clear Corner, Round Edge and Break Edge. These supplementary corner control options allow particular known options to be selected individually for the selected corners, and affect the resultant work piece after the stock has been added, for example a break edge 900. The presently preferred embodiment also provides two new options a round edge (part) and a break edge (part) 905, that also apply to individually selected corners. The (part) functionality virtually modifies the part before offsetting, thereby creating either a round or a chamfer at the chosen corner. The (part) functionality ensures that the chamfer's desired dimensions are always exactly met after removal of the offset/stock, no matter how much has been defined.

Figure 10A:
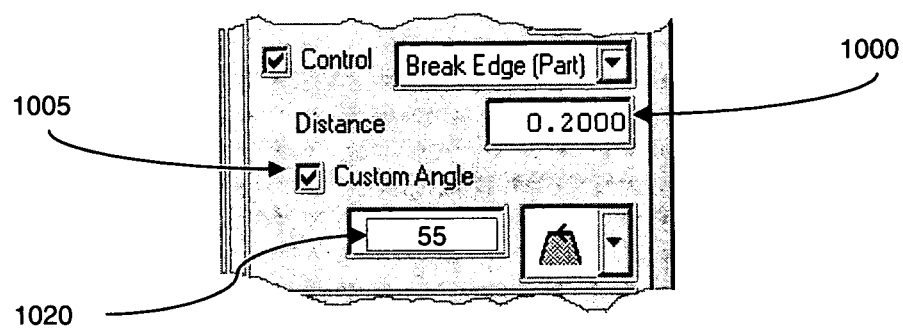
FIG. 10 depicts the portion of a window dialog for adding additional options for supplementing a corner option.
Figure 10B:
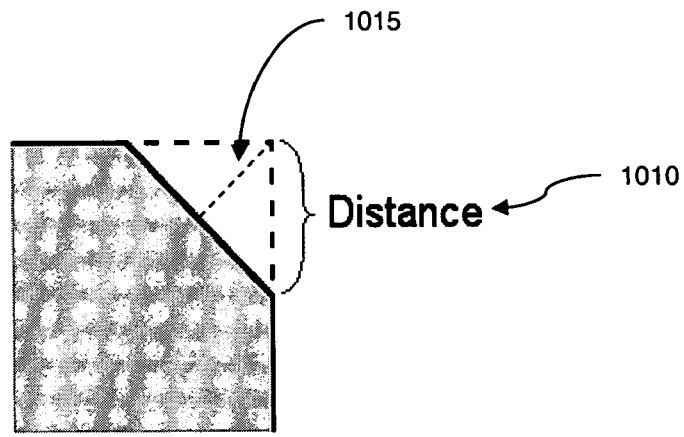
Figure 10C:
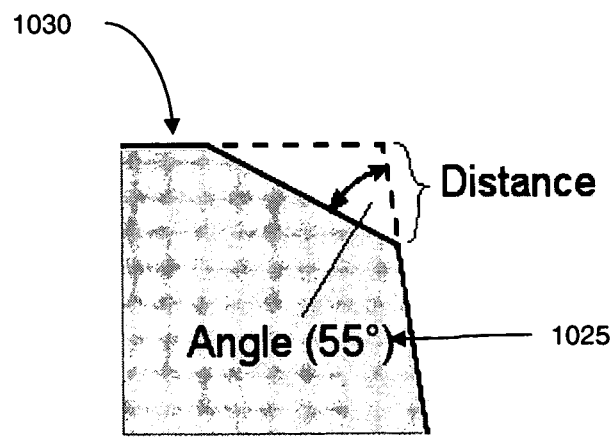

Referring to FIG. 10a, FIG. 10b, and FIG. 10c, once the designer activates the control toggle 530 and selects the break edge (part) option, the application provides the ability to choose either a default chamfer at a specified distance 1010 in a distance field 1000 or the designer may activate a custom angle toggle 1005. The specific distance 1010 is measured from the original corner on the selected member to the new corner where the chamfer starts. While the custom angle toggle 1005 is inactive, the chamfer is symmetric and perpendicular to a bisector 1015 of the corner's included angle. Once the custom angle toggle 1005 is active, the designer enters a desired angle 1020 between 0 and 90, such that an angle 1025 is interpreted as the included angle between an original member 1030 and the new chamfer.

C. Fine Finish Offset/Stock

Figure 11:
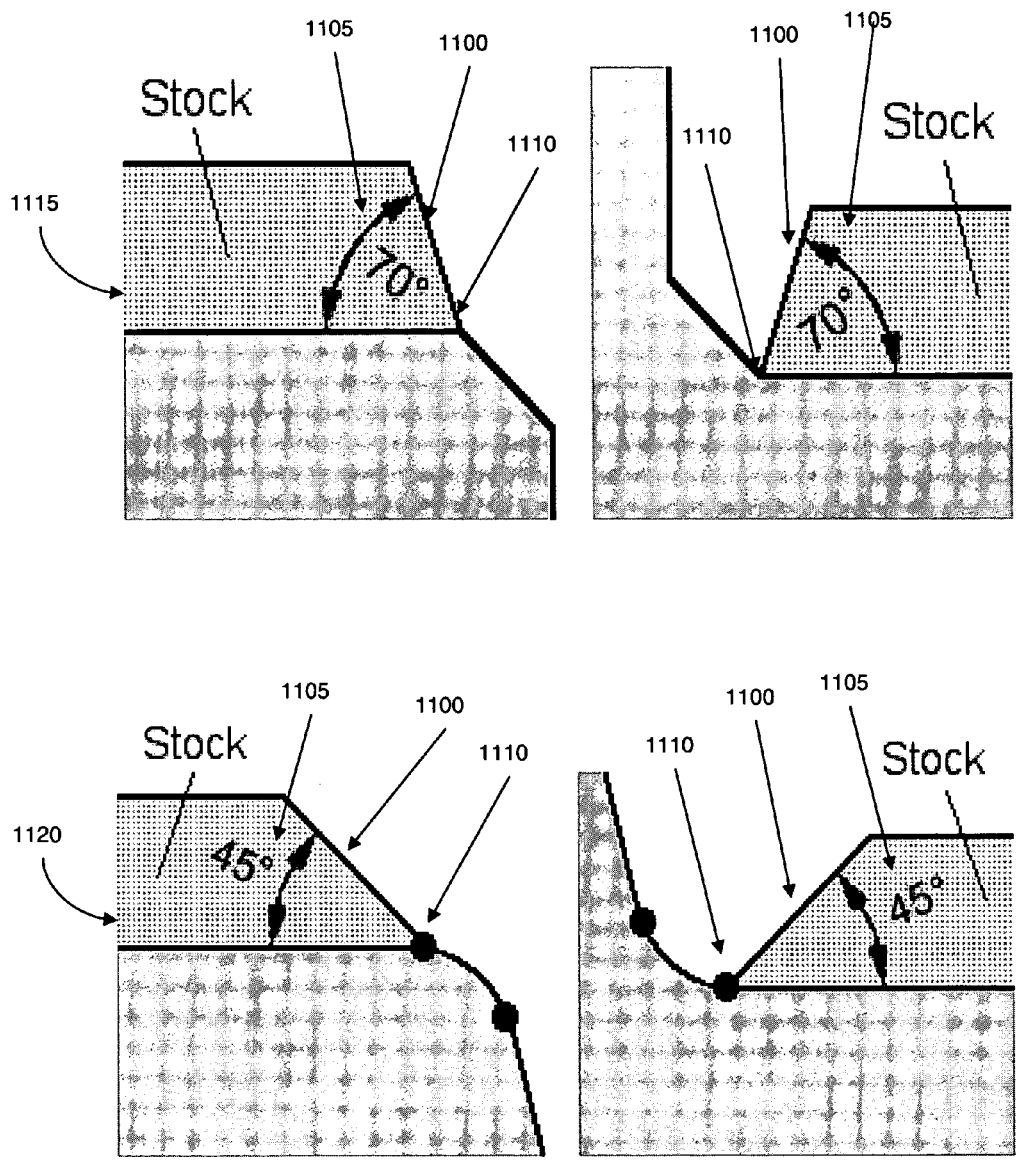
FIG. 11 depicts an angular line option between corners for chamfers or arcs.
Figure 12A:
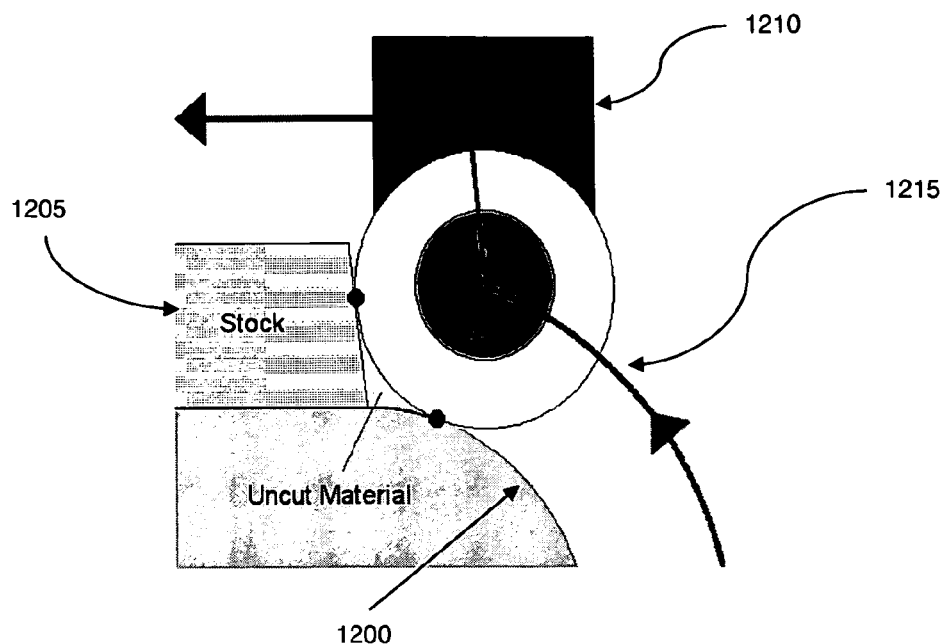
FIG. 12 depicts a corner clean-up control option for use between adjacent members of asymmetric stock values.
Figure 12B:
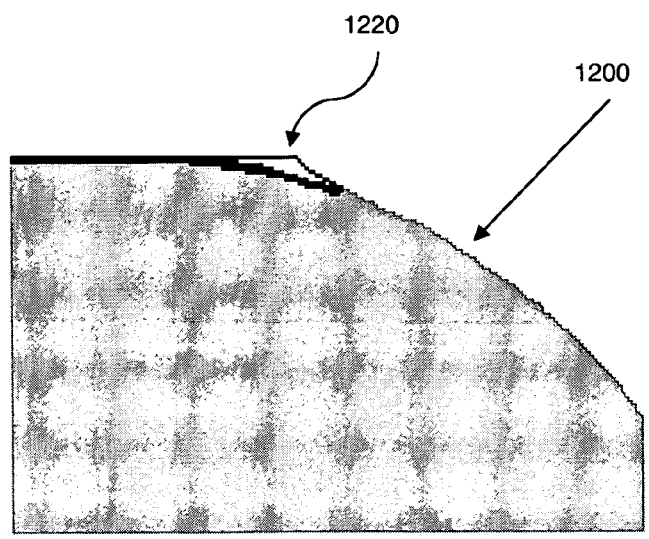
Figure 12C:
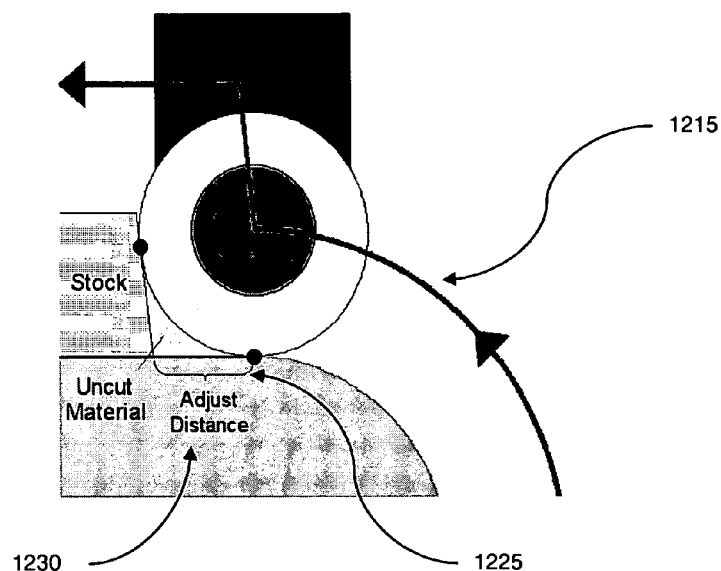
Figure 12D:
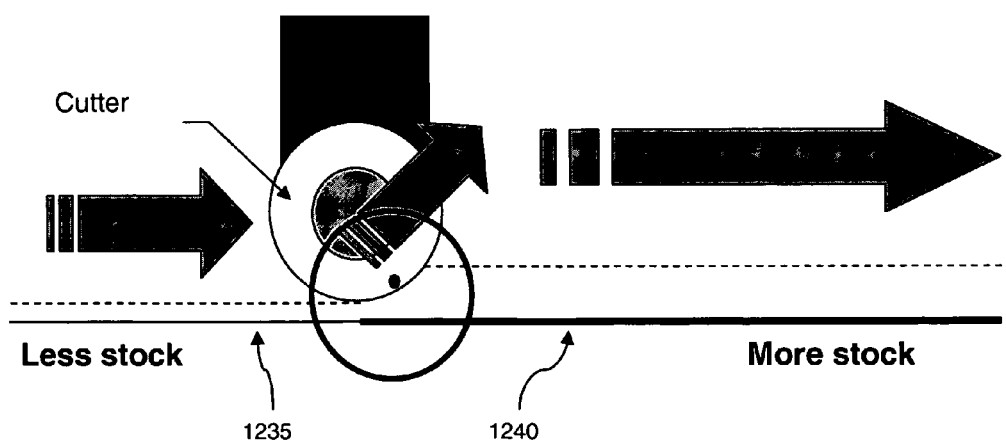

The custom boundary member algorithm as described in its presently preferred embodiment further enables the designer the ability to apply fine finish offset/stock options for custom corners, where fine finish values are always positive, so as to add enough stock for to enable a fine finish step, as negative stock would not meet design or manufacturing intent. The disclosed embodiment presents to the designer the ability to include an angular line option between corners for chamfers or arcs, the resulting effect is illustrated in FIG. 11. With the angular line option, a resulting gap between stock member and work piece is bridged by a linear member 1100 at a user-defined angle 1105 where the linear member 1100 connects a first adjacent member's endpoint 1110 to an intersection point of the stocked second member and the line having the given angle and leading through the considered endpoint. When both members have non-zero stock value, the first member is offset as well, and only then is the connecting line member from the endpoint of the translated/offset first member to the computed intersection point. Whether the corner is chamfered or radius, the original corner is not modified by this option, unless it received some other user-defined stock value. Resulting corners are illustrated in FIG. 11, with an angular line convex chamfer corner, generally shown at 1115 and an angular line convex round corner 1120.

Specific to the angular line option is a feature known as corner clean-up control for both adjacent linear and circular members, illustrated in FIG. 12a to FIG. 12d. In a common scenario after applying the angular line option on a convex round corner 1200 with a stock member 1205, a cutting tool 1210 takes a tool path 1215 such that following the tooling operation a surface portion of the convex round corner 1200 had a remaining stock 1220 and was therefore not clean. To clean the corner, means to define the tool path 1215 farther up the convex round corner 1200 until the stock member 1205 is tangent to an actual corner vertex 1225 of the part thereby translating the extension member to the left by an adjust distance 1230. The adjust distance 1230 represents the distance to cut beyond the circular motion's former endpoint that would have been tangent to the original position of the extension member. Thus the adjust distance 1230 is interpreted as a length parameter and will lead towards and into the corner's member having the larger stock value. Likewise the corner clean-up control analogously applies to a less stocked linear segment adjacent 1235 to a diameter or to arbitrarily oriented members in general, specifically where the adjacent members are collinear, for example a more stocked linear segment 1240.

Figure 13:
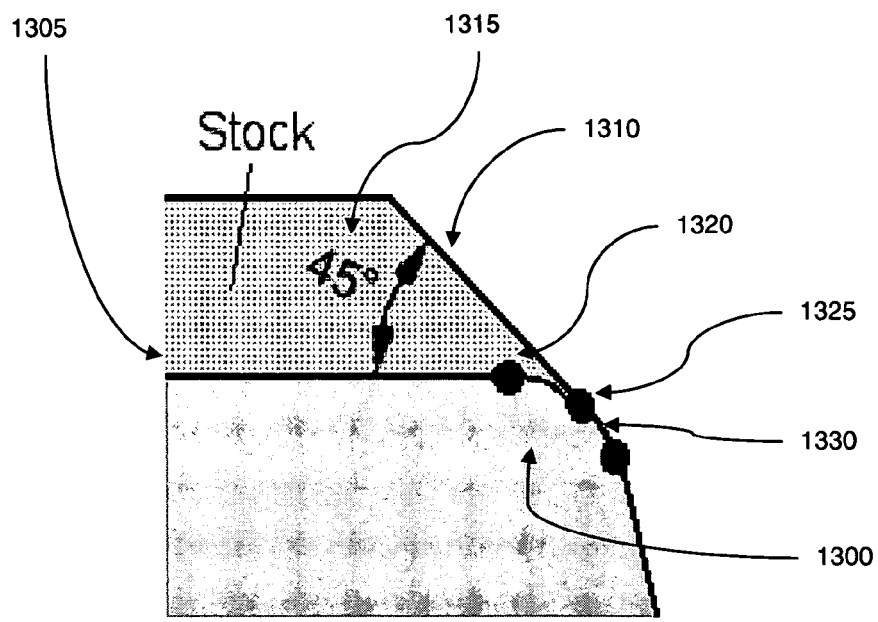
FIG. 13 depicts a tangential line convex round corner option.

The presently preferred embodiment provides a tangential line convex round corner option. As there are no tangents for positive stock on a concave fillet corner, the presently preferred embodiment utilizes the same technique used for an angular line concave fillet corner discussed previously. And for chamfered corners, the presently preferred embodiment provides the same result previously described under general corner options for the convex chamfered corner 610, and the concave chamfered corner 615. Referring to FIG. 13, for tangential line convex round corner option, a convex round 1300 is connected to an adjacent offset member 1305 by adding a new tangent line member 1310 at a user-defined angle 1315. The arc's radius is the same size as before stocking, but it becomes shorter when a convex round endpoint 1320 is replaced by a tangent point 1325, which lies between the new tangential line member 1310 and an arc portion member 1330.

Figure 14:
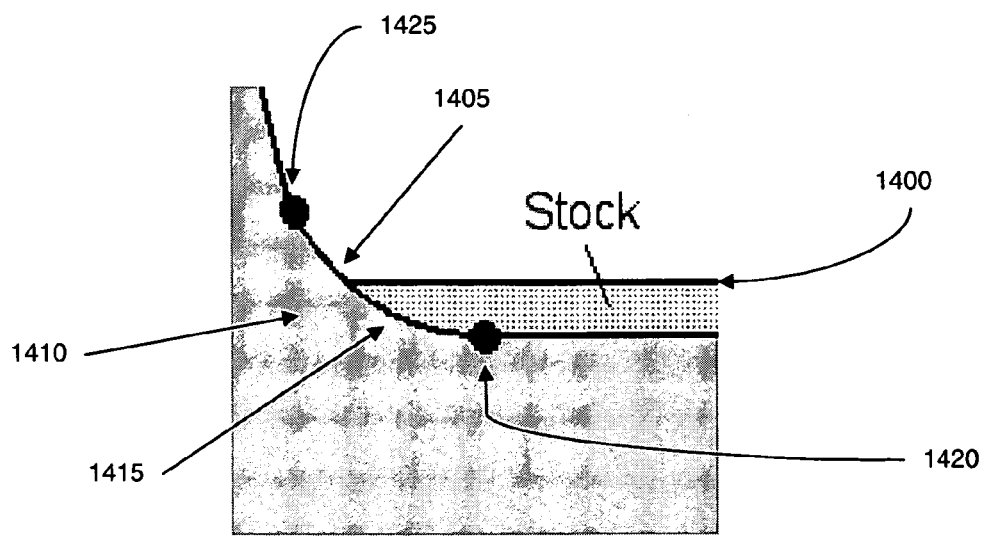
FIG. 14 depicts a shorten (extend) arc or chamfer corner option.

In the presently preferred embodiment, the third corner option provided by use of the custom boundary member algorithm is that of a shorten (extend) arc or chamfer, which is specific to concave corners having an arc as one of the adjacent members. Referring to FIG. 14, a stock line 1400 is extended to an intersection point 1405 with a concave feature 1410. The concave feature's 1410 original radius keeps its size, but an arc 1415 on the concave feature 1410 reduces in length from an original length defined between a first point 1420 and a second point 1425 to new short length defined between the intersection point 1405 and the second point 1425. This option also ensures that the complementary member adjacent to the arc is not changed if there is no stock. It is important to note that a similar option is available in the general corner options, which is not desirable in fine finish stock for the case of concave fillet corners as it would most often lead to a loss of smoothness at the intersection point 1405 of the stock line 1400 and the arc 1415.

D. Combining Custom Member Offset/Stock

In the presently preferred embodiment, when the designer defines general corner offset and tolerance corner offset, or boundary stock and general stock at the same level—either at geometry level or operation level—they are mutually exclusive, meaning the designer can only specify one of these options per level. However, general stock and fine finish stock, or tolerance offset and fine finish offset, can be combined either at geometry group level or at operation level, or even in-between both. This later scenario is widespread in the industry as it is common practice to specify a part's dimensions to a tolerance that must be met after finishing or grinding while fine finish stock has to remain after a roughing operation to facilitate the finishing or grinding processes.

Figure 15:
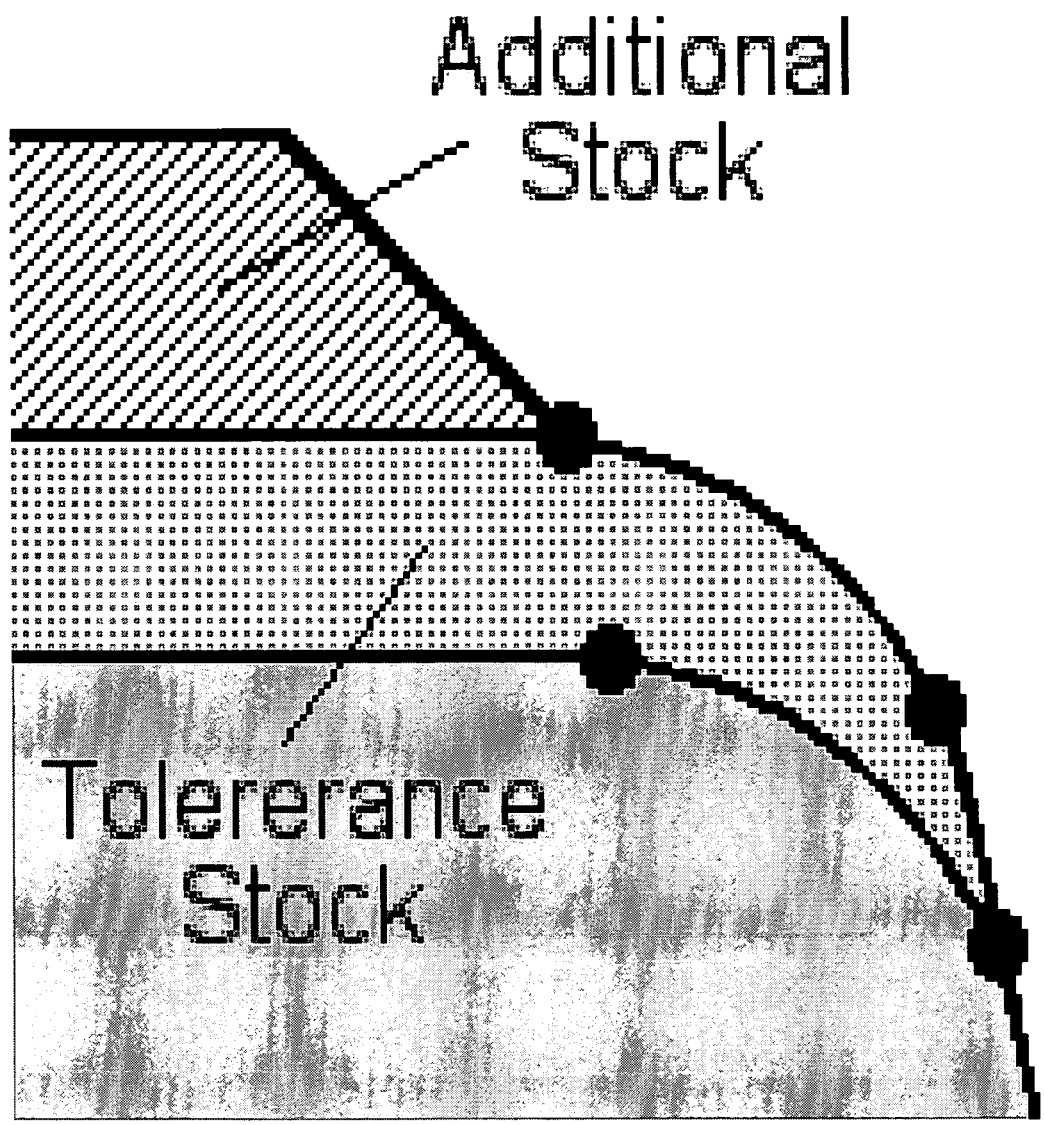
FIG. 15 depicts a combination of a tolerance offset defined at geometry group level with fine finish offset/stock or with general stock specified at operation level.

Referring to FIG. 15, based on the unique and novel concepts disclosed in the presently preferred embodiment, it is now possible to combine a tolerance offset defined at geometry group level with fine finish offset/stock or with general stock specified at operation level. The combination of different kinds of stock include independent decisions of respective corner options. As a result, the presently preferred embodiment employs the following rules for combined member offset and/or custom member stock:

Rule I: The general stock value (operation) is added to the general offset value (global);

Rule II: The Fine Finish Stock value (operation) is added to the Fine Finish Offset value (global);

Rule III: General Stock is applied to its respective stock value in addition to Tolerance Offset, respecting the corresponding individual corner options of either level of specification;

Rule IV: Fine Finish "Offset plus Stock" is applied to its resulting value (sum of "offset" and "stock" value) after any of the complementary offset/stock settings has taken effect on the part. Any corner option specified for Fine Finish Stock (operation level) overwrites its corresponding corner option defined for Fine Finish Offset (geometry group level), but it respects the corner option of any of the other active offset and/or stock types.

For ease of use, the disclosed embodiment offers operation level control over the application of Fine Finish Offset defined at geometry group level, thereby allowing the designer the ability to create a turning operation to remove the Fine Finish Offset that remains on the part surface after a series of roughing or semi-finishing operations without having to define a corresponding Fine Finish Stock for each of those operations.

This concludes the description of the presently preferred embodiment. The following describes some alternative embodiments for accomplishing the present invention. For example, the invention may be implemented in digital electronic circuitry, or in computer hardware, firmware, software, or in combinations thereof. An apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

The foregoing description of the preferred embodiment of the invention has been described for the purposes of illustration and description. It is not intended to be exhaustive or to limit the invention to the precise form disclosed. Many modifications and variations in the disclosed embodiment may occur to those skilled in the art once they learn of the basic inventive concepts. Therefore, it is intended that the scope of the invention be limited not by this detailed description, but rather by all variations and modifications as may fall within the spirit and the scope of the claims appended hereto.

What is claimed is:

1. A computer-implemented method for generating a boundary path, comprising:
    designing a part geometry,
    defining a part boundary parametrically associated to said part geometry, wherein said part boundary has at least one custom boundary member contiguous to at least one transition boundary member, and
    customizing said at least one transition boundary member with said at least one custom boundary member, wherein said customizing is at least one of an ignore member function, a tolerance offset function, a member offset function, a supplemental corner option function, and a fine finish stock function.

2. The method of claim 1, wherein said boundary path represents a milling machine route to create a machined part in at least two finishes.

3. The method of claim 1, wherein said boundary path represents a milling machine route to create a machined part in at least two finishes, wherein said at least two finishes are one of a rough finish and a fine finish.

4. The method of claim 1, wherein said transition boundary member is one of a collinear member, a blend member, and a chamfer member.

5. The method of claim 1, further comprising: defining a clean-up distance between two custom boundary members having different stock values.

6. The method of claim 1, wherein the step of customizing said at least one transition boundary member with said at least one custom boundary member is governed at least in part by a rule set that includes:
    a general stock operation value on said part boundary is added to a general offset global value on said part boundary,
    a fine finish stock operation value on said part boundary added to a fine finish offset global value on said part boundary,
    a general stock applied to a respective stock value and tolerance offset while acknowledge a corresponding individual corner option on said part boundary at one of global and operation, and
    a fine finish offset and a fine finish stock is additive to a plurality of complementary offset values on said part boundary.

7. The method of claim 1, wherein the step of customizing said at least one transition boundary member with said at least one custom boundary member further comprises at least one of the following steps:
    applying said ignore member function to disregard at least one custom boundary member, whereby resulting said part boundary remains consistent,
    applying said tolerance offset function to said at least one custom boundary member,
    applying said member offset function to said at least one custom boundary member,
    applying said supplemental corner option function on said at least one transition boundary member,
    applying said fine finish stock function if determined whether a fine finish stock is applied to said part boundary, and
    providing a resulting part boundary includes a plurality of custom boundary member and a plurality of transition boundary member.

8. A computer-program product tangibly embodied in a machine readable medium to perform a computer-implemented method for generating a part boundary, comprising instructions operable to cause a computer to:
    design a part geometry,
    define a part boundary parametrically associated to said part geometry, wherein said part boundary has at least one custom boundary member contiguous to at least one transition boundary member, and
    customize said at least one transition boundary member with said at least one custom boundary member, wherein said customizing is at least one of an ignore member function, a tolerance offset function, a member offset function, a supplemental corner option function, and a fine finish stock function.

9. The computer-program product of claim 8, wherein said part boundary represents a milling machine route to create a machined part in at least two finishes.

10. The computer-program product of claim 8, wherein said part boundary represents a milling machine route to create a machined part in at least two finishes, wherein said at least two finishes are one of a rough finish and a fine finish.

11. The computer-program product of claim 8, wherein said transition boundary member is one of a collinear member, a blend member, and a chamfer member.

12. The computer-program product of claim 8, further comprising instructions to define a clean-up distance between two custom boundary members having different stock values.

13. The computer-program product of claim 8, wherein said instruction for customizing said at least one transition boundary member with said at least one custom boundary member is governed at least in part by a rule set which include:
    a general stock operation value on said part boundary is added to a general offset global value on said part boundary,
    a fine finish stock operation value on said part boundary added to a fine finish offset global value on said part boundary,
    a general stock applied to a respective stock value and tolerance offset while acknowledge a corresponding individual corner option on said part boundary at one of global and operation, and
    a fine finish offset and a fine finish stock is additive to a plurality of complementary offset values on said part boundary.

14. The computer-program product of claim 8, wherein said instruction for customizing said at least one transition boundary member with said at least one custom boundary member further comprises at least one of the following:
    instructions for applying said ignore member function to disregard at least one custom boundary member, whereby resulting said part boundary remains consistent, instructions for applying said tolerance offset function to said at least one custom boundary member, instructions for applying said member offset function to said at least one custom boundary member, instructions for applying said supplemental corner option function on said at least one transition boundary member, instructions for applying said fine finish stock function if determined whether a fine finish stock is applied to said part boundary, and whereby said part boundary includes a plurality of custom boundary member and a plurality of transition boundary member.

15. A general purpose computing machine, comprising:
an electronic path for transmitting a part boundary signal wherein said part boundary signal comprises:
  instructions for milling a part boundary associated to a part geometry, wherein said part boundary has at least one custom boundary member contiguous to at least one transition boundary member, and
  instructions for milling a customized feature encompassing said at least one transition boundary member adjacent to said at least one custom boundary member.

16. The computer of claim 15, wherein said transition boundary member is one of a collinear member, a blend member, and a chamfer member.

17. The computer of claim 15, further comprising a clean-up function between two custom boundary members having different stock values.

18. A milling machine, comprising:
an input path electrically connected to a controller for interpreting a part boundary signal, wherein said part boundary signal comprises:
  instructions for milling a part boundary associated to a part geometry, wherein said part boundary has at least one custom boundary member contiguous to at least one transition boundary member, and
  instructions for milling a custom feature encompassing said at least one transition boundary member adjacent to said at least one custom boundary member.

19. The milling machine of claim 18, wherein said transition boundary member is one of a collinear member, a blend member, and a chamfer member.

20. The milling machine of claim 18, further comprising a clean-up function between two custom boundary members having different stock values.

21. A general purpose computing machine, comprising:
an electronic path for transmitting a part boundary signal wherein said part boundary signal comprises:
  instructions for milling a part boundary associated to a part geometry, wherein said part boundary has at least one custom boundary member contiguous to at least one transition boundary member, and
  instructions for milling a customized feature encompassing said at least one transition boundary member adjacent to said at least one custom boundary member; and
a clean-up function between two custom boundary members having different stock values.

22. A milling machine, comprising:
an input path electrically connected to a controller for interpreting a part boundary signal, wherein said part boundary signal comprises:
  instructions for milling a part boundary associated to a part geometry, wherein said part boundary has at least one custom boundary member contiguous to at least one transition boundary member, and
  instructions for milling a custom feature encompassing said at least one transition boundary member adjacent to said at least one custom boundary member; and
a clean-up function between two custom boundary members having different stock values.

* * * * *